March 21, 1939.                  S. E. PALMER                        2,150,939
                              PLASTICIZING METHOD
                              Filed March 23, 1936
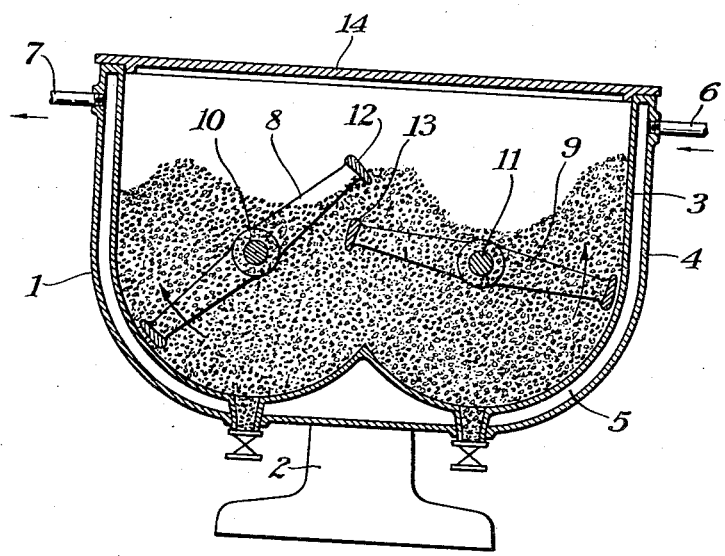
                                                            INVENTOR.
                                                         Spencer E. Palmer
                                    BY   Newton M. Perrins
                                         Daniel J. Mayne
                                                            ATTORNEYS.

Patented Mar. 21, 1939

2,150,939

UNITED STATES PATENT OFFICE 2,150,939

PLASTICIZING METHOD

Spencer E. Palmer, Kingsport, Tenn., assignor, by mesne assignments, to Eastman Kodak Company, Jersey City, N. J., a corporation of New Jersey Application March 23, 1936, Serial No. 70,201

4 Claims. (Cl. 106—40)

This invention relates to a method of incorporating plasticizers in cellulose organic acid esters, and more particularly to a method whereby the so-called solvent plasticizers may be uniformly and homogeneously incorporated with cellulose derivatives typified by cellulose acetate, cellulose acetate propionate, etc., in the production of compositions adapted for the manufacture of molded products.

As is well-known, plasticizers are incorporated with cellulose derivatives in the manufacture of plastic products by grinding, mixing, kneading or otherwise manipulating a mixture of the cellulose derivative material with the plasticizer at ordinary or slightly elevated temperatures. While this technique is well adapted for use with a number of the well-known cellulose derivative plasticizers, experience has shown that in the case of plasticizers which have a solvent action at or above ordinary temperatures upon the particular cellulose organic acid esters, it is impossible to obtain uniform results or satisfactory plasticized products. This is apparently due to the fact that the solvent plasticizers, that is, those having the property or ability of forming solid solutions or gels with the ester, have a pronounced and unavoidable tendency to become locally absorbed on the ester particles or masses with which they come in contact, regardless of whether the material is ground or unground and no amount of subsequent grinding or mixing will effect an even distribution or penetration of the plasticizer into and through the material.

It might be supposed that if the mixture of cellulose organic acid ester and solvent plasticizer were subjected to the action of heat and pressure as by milling on heated rolls, the plasticizer would necessarily be uniformly distributed throughout the mixture. Experience has shown that this is not the case and that even this drastic treatment will not produce the desired result. Not only is it impossible uniformly to plasticize such cellulose derivatives in this way, but the material is found to be extremely difficult to handle in that it continuously gums or balls up on the rolls or other manipulating machinery. These inherent defects have therefore precluded the use of some of the best-known plasticizers in the manufacture of cellulose organic acid ester plastics in accordance with the best accepted practice of the present day, that is, without the use of solvents.

It has been proposed to incorporate this type of plasticizer through the medium of a mutual solvent for the plasticizer and the cellulose organic acid ester material, but this method has the extremely serious drawback that it introduces into the finished plastic product a large amount of volatile solvent which must be removed by long drawn-out curing operations. Even when such plastics are thoroughly cured, they still contain a small but detrimental amount of residual solvent which gives rise to shrinkage, warpage, and distortion of the plastic. Until the advent of the present invention, it has been impossible to employ this valuable class of solvent plasticizers for the manufacture of plastic products in processes which avoid the use of volatile solvents.

This invention accordingly has as its principal object, to provide a method of employing the solvent plasticizers in the plasticizing of cellulose organic acid esters, particularly the single or mixed esters of cellulose such as cellulose acetate and cellulose acetate propionate. Another object is to provide a method of plasticizing cellulose organic acid esters with the solvent plasticizers without the use of volatile solvents. A further object is to provide a method of producing a uniformly plasticized cellulose organic acid ester plastic in which the plasticizer is homogeneously distributed. Other objects will appear hereinafter.

These objects are accomplished by the following invention which, in its broader aspects, comprises the mixing or otherwise mechanically manipulating a mixture of a cellulose organic acid ester with a solvent plasticizer at a temperature at which the plasticizer has no appreciable solvent action upon the material. As indicated above, the obvious method of increasing the plasticizing action of a plasticizer is to heat the mixture in order that the plasticizer will exert a more uniform solvent action upon the cellulose derivative. Diametrically opposed to this idea, and contrary to what would be expected, I have found that by refrigerating the plasticizer or the mixture of plasticizer and cellulose derivative and thus temporarily restraining its inherent solvent action, the desired degree of uniformity can be obtained. In general it may be said there is a critical temperature for each of the solvent plasticizers above which uniform distribution of the plasticizer in the cellulose organic acid ester material cannot be obtained. The lower limit of temperature for uniform mixing is just above the melting point of the plasticizer, since as a practical matter, the plasticizer should be in liquid or at least semi-liquid state under the conditions of operation in order to facilitate proper mechanical working.

In the following examples and description, I have set forth several of the preferred embodiments of my invention, but it is to be understood that they are included merely for purposes of illustration and not as a limitation thereof.

The method of the invention may be conveniently carried out in any simple type of apparatus provided with means for cooling the mix to the desired temperature and with means for mechanically agitating the material sufficiently to bring the plasticizer into intimate contact with the cellulose derivative material. A conventional form of such a device is illustrated in the single figure of the accompanying drawing.

A mixing device may, for example, comprise a mixing vessel 1 suitably mounted upon a base 2 and having double walls 3 and 4 providing a water jacket 5 for the circulation of cold water or other refrigerating or cooling fluid. The jacket 5 is supplied with the cooling fluid by means of inlet conduit 6, while outlet conduit 7 conveys the cooling fluid therefrom. The numerals 8 and 9 designate mechanical mixing devices mounted on rotatable shafts 10 and 11, respectively, driven by a source of power (not shown) and provided with blades 12 and 13 respectively for cutting through the mass undergoing mixing and of so manipulating it that all parts of the cellulose derivative material are intimately brought in contact with the plasticizer. A cover 14 is conveniently provided in order that the temperature of the device may be more effectively controlled and in order that the operation may be carried out with no loss or contamination of material.

*Example I.*—100 parts by weight of cellulose acetate ground to a particle size corresponding to approximately 80 mesh are placed in an apparatus of the type of that shown in the single figure of the drawing, together with 35 parts by weight of dimethyl phthalate, the plasticizer being introduced at a temperature of about 15° C., the temperature of the mix being maintained at about 15° C. by circulating through the water jacket of the device a stream of water cooled to or below this temperature. The mixture of cellulose acetate and plasticizer is then subjected to mechanical mixing for a period of 30 minutes by revolution of the blades of the mixing device which cut through the mass and continuously turn it over and expose new surfaces for contact with the plasticizer. This operation is carried out at constant temperature as previously specified. Upon removal of the mixture from the mixing chamber, it is found that the plasticizer has been uniformly and homogeneously incorporated with the cellulose acetate particles. The plasticized mass, which is in the form of a damp powder in which the particles are nevertheless not appreciably agglomerated, may then be worked mechanically if desired, for the purpose of consolidating the material, or it may be employed directly without such treatment, in a molding operation.

*Example II.*—100 parts by weight of cellulose acetate propionate ground to a particle size corresponding to about 80–100 mesh are mixed as in Example I with 35 parts by weight of dimethyl phthalate. The initial temperature of the plasticizer is 10° C. and the mixing vessel is maintained at approximately the same temperature while the cellulose acetate propionate and plasticizer is subjected to mechanical mixing for a period of 30 minutes. After permitting the material to come to atmospheric temperature, it is found that the plasticizer has been homogeneously and uniformly incorporated with the cellulose acetate propionate particles, resulting in the production of a composition which may then be directly employed in a molding operation or may be otherwise worked as desired.

*Example III.*—100 parts by weight of cellulose propionate of 47% propionyl content ground to a particle size corresponding to 80 mesh are placed together with 40 parts by weight of dibutyl phthalate as in Example I, the initial temperature of the plasticizer being maintained at about 15° C. and the mixture being maintained at or slightly below this temperature. The mixture is subjected to mechanical mixing for a period of 30 minutes. It is found that the resulting mixture is a uniformly and homogeneously plasticized composition of cellulose propionate suitable for use in a molding operation and for other uses.

*Example IV.*—100 parts by weight of cellulose butyrate of 52% butyryl ground to a particle size of 80 mesh are mixed as in the preceding examples with 30 parts by weight of benzyl benzoate, the initial temperature of the plasticizer being about 10° C. for a period of 30 minutes. The product is a uniformly and homogeneously plasticized molding composition.

While I have in the above examples chosen to illustrate my invention by reference to the plasticizing of cellulose acetate, cellulose propionate, cellulose butyrate, cellulose acetate propionate, my invention is also applicable to the plasticizing of other cellulose organic acid esters. It is applicable to either the fully esterified or hydrolyzed esters, but particularly to the hydrolyzed esters as these are particularly adapted for molding compositions due to their inherently greater plasticity than the unhydrolyzed esters.

Likewise, while I have chosen to illustrate my invention by reference to the use of certain specific plasticizers, such as dimethyl phthalate, my invention includes the use of any of those plasticizers which, at ordinary atmospheric temperatures, have a pronounced solvent action upon the cellulose organic acid ester. Of course, the temperature at which a given plasticizer becomes actively solvent with respect to a particular ester varies, both with the plasticizer and with the ester itself. My experimental work leads me to the conclusion that the maximum temperature above which most of these plasticizers are active solvents with respect to any of the commonly employed cellulose organic acid esters, is about 15° C. A table is given below listing some of the best solvent plasticizers for a typical cellulose organic acid ester, namely, cellulose acetate, and showing the approximate critical temperature for each plasticizer, that is, the temperature at which the plasticizer becomes actively solvent toward the ester:

| Plasticizer | Critical temp. |
|---|---|
| | °C. |
| Benzyl lactate | 15 |
| Triacetin | 8 |
| Ethylene glycol diacetate | 4 |
| Diethylene glycol diacetate | 7 |
| Triethylene glycol diacetate | 8 |
| Ethylene glycol dipropionate | 15 |
| Glyceryl chloro dipropionate | 15 |

While I have referred to cellulose organic acid ester material of a specific fineness, it will be evident that I may employ material of varying degrees of fineness. I may, for example, employ material which has been ground until it will pass a 40-300 mesh screen. This material, of course, includes particles of varying degrees of fineness, the coarsest particles not being over a size which will pass a screen of about 40 mesh, while the finest will pass a 300 mesh screen or even finer. This will, of course, include groups of particles such as those having a particle size ranging from 40, 60, 80, etc. to 200 or 300 mesh and so on. It may be said, however, that the finer the material, and the more uniform the particle size, the more readily can the desired plasticizing materials be incorporated therewith.

As a general rule, it is best to cool or refrigerate the plasticizer before it comes in contact with the cellulose derivative material, in order to preclude the possibility of the plasticizer having any appreciable solvent action thereon, as would be the case if the plasticizer were brought in contact with the material at ordinary atmospheric temperatures. It is, of course, necessary that the temperature of the mixing device be maintained sufficiently low to keep the temperature of the mixing mass at or below the temperature at which the plasticizer has any pronounced solvent action.

It will be evident from the above description of my invention that I have provided a novel and valuable method of employing the solvent plasticizers satisfactorily with a wide variety of cellulose organic acid esters, particularly cellulose acetate. My invention thus opens up the use of a large number of plasticizers which were heretofore excluded from use according to commonly accepted practice because of their excessive solvent action on this type of material. As pointed out above, some of the most valuable plasticizing agents were excluded for this reason, but the technique of my process completely overcomes this obstacle. The use of low temperatures in accordance with the technique of my process is diametrically opposed to the teaching of the prior art, which has been to raise the temperature in order to obtain maximum plasticizing effects, and it is wholly inobvious and unexpected that lowering the temperature would make possible the uniform and homogeneous incorporation of a solvent plasticizer with a cellulose organic acid ester.

Not only is it possible to use a rather wide class of plasticizers which have heretofore been ruled out, but my process also eliminates the necessity for extensive grinding and milling operations heretofore considered necessary to obtain satisfactory plastic products. All that is necessary, in accordance with my invention, is to bring the refrigerated plasticizer into intimate contact with the cellulose organic acid ester material and thoroughly mix at a low or relatively low temperature. No subsequent milling, rolling, kneading, or other mechanical treatment is necessary in order to bring the material to a condition in which it may be used in a molding operation. As set forth in the co-pending application of S. E. Palmer and J. S. Kimble, Serial No. 70,200, filed of even date herewith, the plasticized material produced in accordance with the instant invention is particularly adapted for the extrusion type of molding. The product produced as described herein may also be equally well employed in open or injection molding.

What I claim is:

1. The method of uniformly and homogeneously plasticizing a cellulose organic acid ester with a solvent plasticizer which is a solvent of the ester at atmospheric temperatures, which comprises cooling the plasticizer to a temperature below that at which the plasticizer has an active solvent action on the ester but above the melting point of the plasticizer, adding the cooled plasticizer to the cellulose ester, thoroughly mixing the two materials at said temperature and thereafter raising the temperature to a point at which the plasticizer becomes an active solvent of the ester.

2. Thet method of uniformly and homogeneously plasticizing a cellulose organic acid ester with a solvent plasticizer which is a solvent of the ester at atmospheric temperatures, comprising cooling the plasticizer to a temperature below that at which the plasticizer has an active solvent action on the ester but above the melting point of the plasticizer, incorporating the cooled plasticizer with the cellulose ester at a temperature below that at which the plasticizer has an active solvent action on the ester but above the melting point of the plasticizer and thereafter raising the temperature to a point at which the plasticizer becomes an active solvent of the ester.

3. In the method of uniformly and homogeneously plasticizing cellulose acetate with dimethyl phthalate, the steps which comprise cooling the dimethyl phthalate to a temperature below that at which it has an active solvent action on the cellulose acetate but above the melting point of the dimethyl phthalate, incorporating the dimethyl phthalate with the cellulose acetate at a temperature between the melting point of dimethyl phthalate and about 15° C. and thereafter raising the temperature of the mixture to a point above that at which the dimethyl phthalate becomes an active solvent of the ester.

4. The method of uniformly and homogeneously plasticizing cellulose acetate with dimethyl phthalate which comprises cooling the dimethyl phthalate to a temperature below that at which the dimethyl phthalate has an active solvent action on the cellulose acetate but above the melting point of the dimethyl phthalate, adding the cooled dimethyl phthalate to the cellulose acetate, subjecting the mixture to a thorough mechanical mixing at a temperature of 0° C. to 15° C., and thereafter bringing the mixture to a temperature at which the dimethyl phthalate becomes an active solvent of the cellulose acetate.

SPENCER E. PALMER.